United States Patent [19]

Fierens et al.

[11] 4,046,570

[45] Sept. 6, 1977

[54] HARDENING FIXER FOR PHOTOGRAPHIC SILVER HALIDE MATERIAL

[75] Inventors: Marcel Robert Fierens, Duffel; Renaat Frans Heylen, Deurne, both of Belgium

[73] Assignee: AGFA-GEVAERT N.V., Mortsel, Belgium

[21] Appl. No.: 690,585

[22] Filed: May 27, 1976

[30] Foreign Application Priority Data

June 13, 1975 United Kingdom ............... 25405/75

[51] Int. Cl.[2] ............................................ C03C 5/38

[52] U.S. Cl. ............................................ 96/61 R

[58] Field of Search .............................. 96/50 R, 61 R

[56] References Cited

U.S. PATENT DOCUMENTS

| | | | |
|---|---|---|---|
| 3,132,943 | 5/1964 | Smith | 96/61 R |
| 3,201,246 | 8/1965 | Allen | 96/61 R |
| 3,214,454 | 10/1965 | Blaser et al. | 252/180 |
| 3,488,707 | 6/1970 | Willems | 96/94 R |
| 3,647,449 | 3/1972 | Malloy | 96/50 R |
| 3,794,591 | 2/1974 | Brown | 252/178 |
| 3,802,883 | 4/1974 | Ohkubo et al. | 96/61 R |
| 3,839,045 | 10/1974 | Brown | 96/66 R |

*Primary Examiner*—Mary F. Kelley
*Attorney, Agent, or Firm*—A. W. Breiner

[57] ABSTRACT

A hardening fiber composition for use in the processing of photographic silver halide elements is described which contains a 1-hydroxy-alkylidene diphosphonic acid the alkylidene group of which contains from 2 to 5 C-atoms.

6 Claims, No Drawings

HARDENING FIXER FOR PHOTOGRAPHIC SILVER HALIDE MATERIAL

The present invention relates to novel hardening fixers for use in the processing of photographic elements.

The normal processing of photographic elements involves the development of the exposed silver halide to a silver image, conversion of the unexposed silver halide to a soluble salt by fixation and removal of the soluble silver salts and the fixing solution by washing.

Photographic developing, fixing and washing procedures require that the photographic element be wetted repeatedly which results in the softening and swelling of the hydrophilic colloid binder more particularly gelatin. To overcome this difficulty it is common practice to use a hardening fixer. It is conventional to employ for this purpose simple or complex aluminium salts e.g. aluminium chloride, aluminium sulphate, ammonium or potassium, alum (the double salt of aluminium sulphate and potassium or ammonium sulphate).

Such hardening fixers usually comprise an alkali or ammonium thiosulphate as silver complexing agent, a buffer e.g. acetic acid — sodium acetate, a sulphite e.g. sodium sulphite, boric acid, etc. The boric acid retards or prevents the formation of sludge in the fixer, more particularly precipitation of aluminium hydroxide through contamination by the preceding alkaline developer.

Attempts to replace partially or completely the boric acid — in view of possible future shortages see e.g. Europa-Chemie 4, 1975, p. 73 — by other organic acids or complexing agents for polyvalent metal ions e.g. citric acid, phthalic acid, salicylic acid, sulphosalicylic acid, pyro- and polyphosphates e.g. sodium hexametaphosphate, aminocarboxylic acids and aminophosphonic acids e.g. ethylene diamine tetraacetic acid, ethanolamine diacetic acid and ethylene diamine tetramethyl phosphonic acid, polyphosphonic acids without amino groups e.g. 1,2-ethylene diphosphonic acid, etc. were not very successful because either the buffering effect was not effective enough so that a sludge of aluminium hydroxide forms very rapidly or the hardening was impaired.

It has now been found that contrary to the above phosphonic acids, 1-hydroxy alkylidene diphosphonic acids could be used successfully, as partial or complete substitute for boric acid, in hardening fixers comprising an aluminium hardener to retard formation of aluminium hydroxide, without affecting the hardening to a noteworthy extent.

The present invention thus provides a hardening fixer for use in the processing of photographic silver halide elements containing a silver halide solvent, more particularly a thiosulphate or thiocyanate and an aluminium hardener, characterized in that the said hardening fixer also contains a 1-hydroxyalkylidene diphosphonic acid, the alkylidene group of which comprises from 2 to 5 C-atoms, preferably 1-hydroxyethylidene diphosphonic acid and having the formula

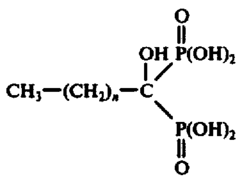

$n$ being 0, 1, 2, or 3.

The present invention also provides a method of processing an exposed photographic silver halide element comprising the steps of developing by means of a developer comprising a silver halide developing agent and treating the developed element with a hardening fixer wherein the hardening fixer is the above hardening fixer of the invention.

Hydroxyalkylidene diphosphonic acids are known complexing agents for polyvalent metal ions and can be prepared as described in U.S. Pat. No. 3,214,454 and in the published German patent application No. 2,343,876. Surprisingly it was found that when used in aluminium hardener fixing solutions they do not impair hardening but do retard formation of a sludge of aluminium hydroxide.

The hydroxy alkylidene diphosphonic acid may be added to the hardening fixer in widely varying amounts. They are generally employed in amounts comprised between about 0.5 g to about 5 g per litre.

The hardening fixer according to the present invention may comprise as silver halide solvent a thiosulphate or thiocyanate, thiosulphate being preferred however e.g. ammonium thiosulphate, sodium thiosulphate and the like as described in U.S. Pat. No. 3,582,322. The amount of silver complexing agent is as usual e.g. comprised between about 0.5 and about 2.5 mol per litre.

The aluminium hardener is of the kind generally used in acid hardening fixers wich include soluble aluminium salts or complexes like aluminium chloride, aluminium sulphate and potassium or ammonium alum. The amount of aluminium hardener is dependent on the desired hardening effect which depends on the particular photographic element to be processed and prehardening stages e.g. possible development by means of a developing solution containing hardening agents e.g. dialdehyde hardeners as represented by glutaraldehyde or its bisulphite addition product. Generally the amount of aluminium hardener is at least 0.01 mol, and preferably between about 0.01 mol and about 0.2 mol per litre.

The fixer solution may further comprise the usual ingredients e.g. inorganic or organic acids to obtain the required acidity which is generally between about pH 3.5 and about pH 5.5 e.g. sulphuric acid, acetic acid and citric acid, buffers e.g. sodium acetate, sodium citrate, a borate e.g. borax, sulphites e.g. sodium sulphite and bisulphites e.g. sodium and potassium metabisulphite, wetting agents and the like.

In the method of processing exposed photographic elements according to the present invention, the materials may be treated in a stop bath after development before treating the developed materials in the hardening fixer of the present invention. In automatic processing machines, however, where processing generally occurs at elevated temperatures to accelerate the processing, fixing usually follows development directly. After the fixing stages, the materials are washed with water and dried in the usual way. The processing according to the present invention can be conventional processing at room temperature or rapid processing at elevated temperature e.g. at a temperature above 30° C. The photographic elements for which the novel hardening fixer of the present invention can be used include black-and-white as well as colour materials, medical and industrial X-ray materials, lithographic materials, etc.

The following example illustrates the present invention.

EXAMPLE

A conventional photographic hardening fixer A of the following composition was prepared:

| | | |
|---|---|---|
| A. | ammonium thiosulphate | 200 g |
| | boric acid | 5 g |
| | glacial acetic acid | 10 ml |
| | sodium acetate-3-water | 20 g |
| | sodium metabisulphite | 15 g |
| | aluminum chloride-6-water | 10 g |
| | water to make | 1 liter |

An other hardening fixer B was prepared by replacing the amount of boric acid in composition A by 2 g of 1-hydroxy-ethylidene diphosphonic acid.

With the above hardening fixers A and B a series of comparative tests were carried out as described hereinafter:

a. fixing speed

By means of a photocell, the clearing time of a photographic black-and-white film material (commercial medical X-ray material) in each of the above fixing compositions A and B was measured under standard conditions.

In each of the compositions substantially the same time was required to obtain a clear film.

b. hardening effect

Identical strips of a commercial medical X-ray film material were developed (20 sec. at 35° C) and fixed (10 sec. at 30° C) in an automatic roller-transport processing machine. The moisture-uptake and the abrasion resistance of the strips measured after fixing in one of the above fixers are listed in the following table.

The moisture-uptake is the difference in weight between the strips weighed directly after fixing and weighed after having been dried.

The values given hereinafter for the abrasion resistance are the pressures (in gram) necessary to be applied to a steel ball having a diameter of ¼ inch to make it penetrate through the wet emulsion layer on which the ball is placed, when the ball is drawn over the strips.

Table

| fixer | moisture-uptake | abrasion resistance |
|---|---|---|
| A | 22.3 g/sq.m | 750 g |
| B | 21.9 g/sq.m | 750 g |

The values show that the fixer comprising 1-hydroxy-ethylidene diphosphonic acid has substantially the same hardening effect as the fixer comprising boric acid.

c. aluminium hydroxide formation

When both fixers A and B were titrated under identical circumstances with alkali to determine at which pH value aluminium hydroxide forms it was found that composition B was only slightly inferior than composition A: the pH increase relative to the initial pH-value at which aluminium hydroxide formation began was 1 for fixer A and .7 for fixer B.

The results of the above tests clearly illustrate that 1-hydroxyethylidene diphosphonic acid is a valuable substitute for boric acid in hardening fixing compositions comprising an aluminium hardener.

We claim:

1. A hardening fixer composition for use in the processing of photographic silver halide elements, comprising a thiocyanate or thiosulphate silver halide solvent and an aluminum hardener, wherein the said fixer composition also contains a 1-hydroxy-alkylidene diphosphonic acid of the formula:

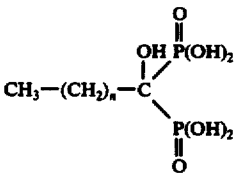

*n* being 0, 1, 2, or 3.

2. A hardening fixer according to claim 1, wherein the silver halide solvent is ammonium or sodium thiosulphate.

3. A hardening fixer according to claim 1, wherein the aluminium hardener is potassium or ammonium alum, aluminium chloride or aluminium sulphate.

4. A hardening fixer according to claim 1, wherein the hydroxy alkylidene diphosphonic acid is 1-hydroxy-ethylidene diphosphonic acid.

5. A hardening fixer according to claim 1, wherein the hydroxy alkylidene diphosphonic acid is added in an amount comprised between about 0.5 g to about 5 g per litre.

6. In a method of processing an imagewise exposed photographic silver halide element comprising the steps of developing by means of a developer comprising a silver halide developing agent and treating the developed element with a hardening fixer comprising an aluminum hardener and a thiocyanate or thiosulphate silver halide solvent, the improvement which comprises using in the fixer composition a 1-hydroxy-alkylidene diphosphonic acid of the formula:

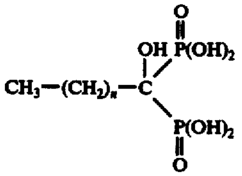

*n* being 0, 1, 2, or 3.

* * * * *